United States Patent [19]

Revis et al.

[11] Patent Number: 5,075,348

[45] Date of Patent: * Dec. 24, 1991

[54] MULTIFUNCTIONAL ACRYLATE BASED ABRASION RESISTANT COATING COMPOSITION

[75] Inventors: Anthony Revis; Chana W. Evans, both of Saginaw County, Mich.

[73] Assignee: Dow Corning Corporation, Midland, Mich.

[*] Notice: The portion of the term of this patent subsequent to Nov. 27, 2007 has been disclaimed.

[21] Appl. No.: 607,953

[22] Filed: Nov. 1, 1990

[51] Int. Cl.$^5$ ............................ C08F 2/46; C08F 20/04
[52] U.S. Cl. ...................................... 522/84; 522/182; 522/183; 526/318.3
[58] Field of Search ................. 522/84, 182, 183; 526/318.3

[56] References Cited

U.S. PATENT DOCUMENTS

| | | | |
|---|---|---|---|
| 4,478,876 | 10/1984 | Chung | 522/83 |
| 4,486,504 | 12/1984 | Chung | 428/412 |
| 4,491,508 | 1/1985 | Olson et al. | 522/77 |
| 4,822,828 | 4/1989 | Swofford | 522/84 |
| 4,973,612 | 11/1990 | Cottington et al. | 522/84 |

FOREIGN PATENT DOCUMENTS 286409 11/1988 Japan .

*Primary Examiner*—Marion E. McCamish
*Assistant Examiner*—Mark Chapman
*Attorney, Agent, or Firm*—John D. Thallemer

[57] ABSTRACT

A radiation curable protective coating composition is disclosed which contains at least one multifunctional acrylate or methacrylate monomer and colloidal silica dispersed in water or an organic solvent/water mixture. When applied to a substrate and radiation cured, the composition forms a transparent abrasion resistant, weather resistant, ultraviolet light resistant, coating firmly held thereon.

15 Claims, No Drawings

MULTIFUNCTIONAL ACRYLATE BASED ABRASION RESISTANT COATING COMPOSITION

BACKGROUND OF THE INVENTION

This invention relates to a radiation curable protective coating composition. More specifically, it relates to a coating composition which contains at least one multifunctional acrylate or methacrylate monomer and colloidal silica dispersed in water or in an organic solvent/water mixture. When applied to a substrate and radiation cured, the composition forms a transparent abrasion resistant, weather resistant, ultraviolet light resistant, coating firmly held thereon. In addition, substrates coated with this composition may be tinted and/or dyed.

Presently available radiation curable silicone coating compositions use silanes to stabilize and suspend silica. For example, U.S. Pat. No. 4,486,504, issued Dec. 4, 1984, discloses an ultraviolet radiation curable silicone coating composition containing a non-silyl acrylate, an acryloxy or glycidoxy functional silane, colloidal silica and a photoinitiator. U.S. Pat. No. 4,822,828 discloses an aqueous radiation curable coating composition containing a vinyl-functional silane which is the partial condensate of silica and a silane, and a multifunctional acrylate. In such compositions, the silanes undergo hydrolysis with the water present in aqueous dispersions of colloidal silica. Thus, the methoxy groups on the silane are replaced by hydroxy groups which hydrogen bond to, or form covalent bonds with, the hydroxy groups present on the surface of the silica particles. Thus, the silica particles remain suspended and do not precipitate in the presence of the hydrophobic acrylate monomers.

Silanes have been eliminated in certain radiation curable coating compositions. For example, Japanese Kokai Patent No. Sho 63[1988]-286409, issued Nov. 24, 1988, discloses a coating composition containing an α, β-unsaturated carboxylic acid compound and colloidal silica. In such a composition the acid group on the α, β-unsaturated carboxylic acid compound hydrogen bonds to, or forms covalent bonds with, the hydroxy groups present on the surface of the silica particles. Thus the silica particle remain suspended. Aqueous dispersions of colloidal silica, however, may not be used in Japanese Patent No. Sho 63[1988]-286409. Commonly assigned copending U.S. application Ser. No. 07/423,159, filed Oct. 18, 1989, also discloses a silane free coating composition wherein aqueous dispersions of colloidal silica may be used. This composition contains a hydroxy acrylate, colloidal silica and a multifunctional acrylate monomer. In this composition the hydroxy group on the hydroxy acrylate hydrogen bonds to, or forms covalent bonds with, the hydroxy groups present on the surface of the silica particles. Thus the silica particles remain suspended and do not precipitate or gel.

The present inventors have discovered a silane-free coating composition in which aqueous dispersions of colloidal silica may be used and which does not require hydroxy functional groups to stabilize the silica particles.

SUMMARY OF THE INVENTION

Accordingly, it is one object of the present invention to provide a protective coating for solid substrates which does not contain silanes.

Another object of the present invention is to provide a silane-free protective coating composition in which aqueous dispersions of colloidal silica may be used.

Still another object of this invention is to provide a coating composition for solid substrates which, following radiation cure, forms a transparent abrasion resistant coating.

These and other objects are accomplished herein by a radiation curable coating composition comprising:
(A) from 30 to 99 percent, based on the total weight of the composition, of at least one multifunctional acrylate or methacrylate monomer; and
(B) from 1 to 70 percent, based on the total weight of the composition, of colloidal silica dispersed in water or in an organic solvent/water mixture.

DETAILED DESCRIPTION OF THE INVENTION

Component (A) of this novel composition comprises at least one acrylate or methacrylate monomer which contains two or more acrylate or methacrylate functional groups. These multifunctional acrylate or methacrylate monomers comprise 30 percent to 99 percent, preferably, 30 percent to 45 percent, of the coating composition. Some preferred multifunctional acrylate monomers useable as component (A) include: diacrylates, such as
1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
polyethylene glycol diacrylate, and
bisphenol A dimethacrylate;
triacrylates such as trimethylolpropane triacrylate, trimethylolpropane trimethacrylate, pentaerythritol monohydroxy triacrylate, and trimethylolpropane triethoxy triacrylate;
tetraacrylates, such as pentaerythritol tetraacrylate and di-trimethylolpropane tetraacrylate;
and pentaacrylates, such as dipentaerythritol (monohydroxy) pentaacrylate. These multifunctional acrylate monomers are commercially available from Aldrich Chemical Company, Inc., Milwaukee, Wis.

The second component (B) includes silica in the form of a colloidal dispersion. Useful in the present invention are dispersions of submicron size silica ($SiO_2$) particles suspended in water or in an organic solvent/water mixture. The dispersion of colloidal silica comprises 1 percent to 70 percent, preferably, 55 percent to 70 percent, of the coating composition. Colloidal silica is available in both acidic and basic form. Either form may be utilized. However, when basic colloidal silica is used, the pH is adjusted to between 3.0 and 5.0 before combining the colloidal silica with the other components. Examples of useful colloidal silica include: Nalco 1034A colloidal silica, Nalco 1129 colloidal silica, Nalco 2327 colloidal silica, Nalco 2326 colloidal silica and Nalco 1140 colloidal silica, which can be obtained from Nalco Chemical Company, Naperville, Ill.

Nalco 1034A has a mean particle size of 20 nm and an $SiO_2$ content of approximately 34% by weight in water with a pH of approximately 3.1. Nalco 1129 has a mean particle size of 20 nm and an $SiO_2$ content of approximately 30% by weight in a solution of 40% isopropanol (IPA) and 30% water. Nalco 2327 has a mean particle size of 20 nm and an $SiO_2$ content of approximately 40% by weight in water with a pH of approximately 9.3. Nalco 2326 has a mean particle size of 5 nm and an $SiO_2$ content of approximately 14.5% by weight in water with a pH of approximately 9.0. Nalco 1140 has a mean particle size of 15 nm and an $SiO_2$ content of approximately 40% by weight in water with a pH of approximately 9.7.

The compositions of this invention may optionally include a diluent selected from the group consisting of isopropanol, t-butanol, n-propanol, n-butanol, methanol, ethanol, ethylene glycol n-butyl ether, and mixtures thereof. Other diluents may also be used as long as a diluent selected from the aforementioned group is present in an amount of at least 17 percent, based on the total amount of diluents in the composition.

Other additives can be added to the compositions in order to enhance the usefulness of the coatings. For example, leveling agents, ultraviolet light absorbers, hindered amine light stabilizers (HALS), oxygen inhibitors, dyes and the like, can be included herein. All of these additives, and the use thereof, are well known in the art and do not require extensive discussions. Therefore, only a limited number will be referred to, it being understood that any of these compounds can be used as long as it does not deleteriously effect either the radiation curing or the transparency of the coating.

A particularly desirable additive has been found to be a small amount of a leveling agent. Leveling agents can be used on substrates to cover surface irregularities and to aid in the uniform dispersion of the coating composition. For purposes of the present invention, the addition of 0.01 to 5.0 percent of commercial silicone glycol leveling agents, based on the weight of the composition, provide the coating composition with desirable flowout and wetting properties.

Also useful as additives to the present coating compositions are hindered amine light stabilizers and UV absorbers. Hindered amine light stabilizers and UV absorbers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl)[3,5-bis(1,1-dimethylethyl-4-hydroxyphenyl)methyl]butylpropanedioate, available as Tinuvin®144, from CIBA-GEIGY Corporation, Hawthorne, N.Y. A preferred UV absorber is 2,2'4,4'-tetrahydroxybenzophenone, available as Uvinul® D-50, from BASF Wyandotte Inc., Parsippany, N.J.

Incorporating UV absorbers into the instant compositions will permit the curing process regardless of whether UV or electron beam radiation is used to cure the composition. However, in the situation where UV radiation is to be used to cure the composition, the amount of UV absorbers added must be carefully controlled so as not to hinder the cure. This limitation does not exist in the case of electron beam radiation cure.

The compositions of the present invention are prepared by combining the multifunctional acrylate monomers with colloidal silica and optionally, adding a diluent. If basic colloidal silica is used, the pH is adjusted to between 3.0 and 5.0 with an organic acid of the formula RCOOH, wherein R is a monovalent hydrocarbon having from 2 to 8 carbon atoms, before the colloidal silica is combined with the other components. The mixture is then agitated and allowed to stand for a period of time before being applied to a substrate.

The above described compositions can be applied to a variety of solid substrates by methods such as roller coating, flow coating, dip coating, spin coating, spray coating, slot coating and curtain coating techniques. These various methods of coating allow the compositions to be placed on a substrate at variable thicknesses thus allowing a wider range of use of the compositions. Coating thicknesses may vary, but for improved abrasion resistance coating thicknesses of 2-25 microns, preferably about 5 microns, are recommended.

The compositions may then be crosslinked by either ultraviolet light or electron beam radiation. If ultraviolet light is used to crosslink the coating compostion, inclusion of a photoinitiator into the coating composition is necessary. The photoinitiator, when one is employed, comprises up to 10 percent of the composition, preferably 0.5 to 3 percent. There are no special restrictions on the photoinitiators as long as they can generate radicals by the absorption of optical energy. Examples of preferred photoinitiators are 2-hydroxy-2-methyl-1-phenyl -propan-1-one (Darocur®1173), sold by EM Industries, Inc., Hawthorne, N.Y., and 2,2-dimethoxy-2-phenyl-acetyl-phenone (Irgacure®651), sold by Ciba-Geigy Corporation, Hawthorne, N.Y. In addition, oxygen inhibitors may also be used in conjunction with the photoinitiators. A preferred oxygen inhibitor is 2-ethylhexyl-para-dimethylaminobenzoate, available as Uvatone®8303, from The Upjohn Company, North Haven, CT.

Alternatively, the coating composition may be electron beam radiation cured. Electron beam sources of various types such as van de Graaff-type, resonance transformer-type, linear-type, dynatron-type, and high frequency-type can be used as a source of electron beam. Electron beam having energy of from 50 to 1000 KeV, preferably from 100 to 300 KeV discharged therefrom, may be used to irradiate in a dose of from 0.1 to 10.0 Mega Rads.

The compositions will adhere to substantially all solid substrates. Substrates which are especially contemplated herein are transparent and nontransparent plastics. More particularly, these plastics are synthetic organic polymeric substrates such as acrylic polymers, polycarbonates, polyesters, polyamides, polyimides, acrylonitrile-styrene copolymers, styrene-acrylonitrile-butadiene copolymers, polyvinyl chloride, butyrates, polyethylene and polyolefins. Other solid substrates contemplated herein include metal, wood, painted surfaces, leather, glass, ceramics, textiles and paper. The compositions of this invention have particular utility as transparent coatings for polycarbonates.

The apparatus and testing procedures used to illustrate the concepts in accordance with the present invention are set forth as follows:

ABRASION TEST (TABOR TEST)

Abrasion resistance was determined according to ASTM Method D-1044. The instrument used was a Teledyne Taber model 503 Taber Abraser with two 250 gram auxiliary weights (500 gram load) for each of the CS10F abrasive wheels. The polycarbonate test panels were subjected to 100 and 500 cycles on the abraser turntable. The percent change in haze, which is the criterion for determining the abrasion resistance of a coating, was determined by measuring the difference in haze of the unabrased and abrased coatings. Haze is defined as the percentage of transmitted light which, in passing through the sample, deviates from the incident beam by forward scattering. In this method, only light flux that deviates more than 2.5 degrees on the average was considered to be haze. The percent haze on the coatings was determined by ASTM Method D1003. A Gardner Haze Meter was used. The haze was calculated by measuring the amount of diffused light, dividing by the amount of transmitted light and multiplying by one hundred.

ADHESION TEST

Adhesion was measured by cross-hatch adhesion. A series of cross-hatch scribes were made in an area of one square inch with lines to form 1/10 inch squares. This surface was covered with 1.0 inch No. 600 Scotch Brand adhesive tape which was pressed down firmly over the cross-hatched area. The tape was withdrawn from the surface of the substrate with one rapid motion at about a 90° angle. This action of applying and removing the tape was carried out three times and then the substrate was observed. The number of squares remaining intact on the substrate was reported as a percentage of the total number of squares on the grid.

STEEL WOOL TEST

A two inch square of No. 0000 steel wool was applied over the face of a 24 oz. hammer and was secured with a rubber band. Coated sample blanks were tested for scratch resistance to 20 double rubs across the center of the sample with the weighted steel wool. The hammer was held by the end of its handle such that the majority of the pressure on the steel wool came from the hammer head. The sample was graded according to the amount of scratching produced by the steel wool and hammer. The absence of scratches on the sample was graded one; slight scratching was graded two; and heavy scratching was graded three.

PENCIL TEST

This test was meant to be a qualitative method of determining scratch resistance of a coating. A coated panel was placed on a firm horizontal surface. A pencil was held firmly against the film at a 45° angle with the point away from the operator and pushed away from the operator in a ¼ inch stroke. The process was started with the hardest lead pencil and continued down the scale of hardness to the pencil that would not cut into or gouge the film. The hardest pencil that would not cut through the film to the substrate for a distance of at least ¼ inch was reported according to the following scale from Berol Corporation, Brentwood, Tenn.

-----softer-----        ----------harder---------
6B, 5B, 4B, 3B, 2B, B, HB, F, H, 2H, 3H, 4H, 5H, 6H, 7H, 8H, 9H.

The HB grade is approximately equal to that of a #2 pencil. The F grade is slightly harder and is the one most commonly used. The H grades are harder than that and get progressively harder up through the 9 H grade which is very hard. The B grade is softer than the HB grade and get progressively softer through the 6B grade which is very soft.

TRANSPARENCY TEST

The percent light transmittance of the samples was determined using a Cary 210 Spectrophotometer with a wavelength range of 600 nanometers. Lexan ® polycarbonate from General Electric Company, Schenectady, N.Y., was used as a reference sample and substrate. The percent light transmittance of the uncoated polycarbonate was determined to be 86.9%. The coating compositions in Examples I-XXX were applied to the polycarbonate and the percent light transmittance was determined as a percentage of the transmittance of the uncoated polycarbonate sample.

The invention will be further illustrated by a consideration of the following examples. All parts and percentages in the examples are on a weight basis unless otherwise stated.

EXAMPLE I

A mixture of 51.46 grams of isopropanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE II

A mixture of 51.46 grams of t-butanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE III

A mixture of 51.46 grams of n-propanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE IV

A mixture of 51.46 grams of methanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE V

A mixture of 51.46 grams of ethylene glycol n-butyl ether, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE VI

A mixture of 51.46 grams of ethanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE VII

A mixture of 51.46 grams of sec-butanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE VIII

A mixture of 51.46 grams of sec-butanol, 12.0 grams of isopropanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE IX

A mixture of 51.46 grams of n-butanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE X

A mixture of 51.46 grams of n-butanol, 16.0 grams of isopropanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XI

A mixture of 51.46 grams of n-butanol, 25.0 grams of isopropanol, 1.36 grams of hexanedioldiacrylate and 3.79 grams of trimethylolpropanetriacrylate was prepared. Nalco 1034A colloidal silica, 11.24 grams, was added and the mixture was prepared. To 10.0 grams of this mixture was added 0.06 grams of 2-Hydroxy-2-methyl-1-phenyl-propan-1-one and 0.01 grams of 2-ethylhexyl-para-dimethylaminobenzoate. This mixture was flow coated onto a 4×4×1/16 inch polycarbonate panel, which was allowed to air dry for 5 minutes. The coated polycarbonate sample was then UV cured by passing the sample under a medium pressure mercury vapor arc lamp with an average intensity of 91.56 mW/cm$^2$ at a line speed of three feet per minute. The test results are summarized in Table I.

EXAMPLE XII

A mixture of 51.46 grams of n-butanol, 25.0 grams of isopropanol, 1.36 grams of hexanedioldiacrylate and 3.79 grams of trimethylolpropanetriacrylate was prepared. Nalco 1034A colloidal silica, 11.24 grams, was added and the mixture was shaken. To 10.0 grams of the mixture was added 0.04 grams of 2,2′,4,4′-tetrahydroxybenzophenone and 0.03 grams of bis (1,2,2,6,6-pentamethyl-4-piperidinyl)[3,5-bis(1,1-dimethylethyl-4-hydroxyphenyl)methyl]butylpropanedioate. This mixture was flow coated onto a 4×4×1/16 inch polycarbonate panel and allowed to air dry for five minutes. The coated panel was cured as in Example I. The test results are summarized in Table I.

EXAMPLE XIII

A mixture of 51.46 grams of isopropanol, 1.36 grams of hexanedioldiacrylate and 3.79 grams of trimethylolpropanetriacrylate was prepared. Nalco 1034A colloidal silica, 11.24 grams, was added and the mixture was shaken. To 10.0 grams of this mixture was added 0.06 grams of 2-Hydroxy-2-methyl-1-phenyl-propan-1-one and 0.01 grams of 2-ethylhexyl-para-dimethylaminobenzoate. This mixture was flow coated onto a 4×4×1/16 inch polycarbonate panel, which was allowed to air dry for 5 minutes. The coated panel was cured as in Example XI. The test results are summarized in Table I.

EXAMPLE XIV

A mixture of 51.46 grams of n-butanol, 25.0 grams of isopropanol, 1.36 grams of hexanedioldiacrylate and 3.79 grams of trimethylolpropanetriacrylate was prepared. Nalco 1034A colloidal silica, 11.24 grams, was added and the mixture was shaken. To 10.0 grams of the mixture was added 0.04 grams of 2,2′,4,4′-tetrahydroxybenzophenone and 0.03 grams of bis(1,2,2,6,6-pentamethyl-4-piperidinyl)[3,5-bis(1,1-dimethylethyl-4-hydroxyphenyl)methyl]butylpropanedioate. This mixture was flow coated onto a 4×4×1/16 inch polycarbonate panel and allowed to air dry for five minutes. The coated panel was cured as in Example I. The test results are summarized in Table I.

EXAMPLE XV

A mixture of 51.46 grams of n-butanol, 11.0 grams of methanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XVI

A mixture of 51.46 grams of sec-butanol, 11.0 grams of methanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XVII

A mixture of 51.46 grams of n-butanol, 11.0 grams of ethanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XVIII

A mixture of 51.46 grams of sec-butanol, 10.0 grams of ethanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XIX

A mixture of 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XX

A mixture of 5.15 grams of trimethylolpropanetriacrylate and 11.24 grams of Nalco 1034A colloidal silica was prepared. The mixture was flow coated onto a 4×4×1/16 inch polycarbonate panel and allowed to air dry for five minutes. The coated panel was cured as in Example I. The test results are summarized in Table I.

EXAMPLE XXI

A mixture of 25.73 grams of isopropanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXII

A mixture of 12.86 grams of isopropanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXIII

A mixture of 19.30 grams of isopropanol, 1.36 grams of hexanedioldiacrylate and 3.79 grams of trimethylolpropanetriacrylate was prepared. Nalco 1034A colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXIV

A mixture of 51.46 grams of isopropanol, 1.36 grams of hexanedioldiacrylate and 3.79 grams of trimethylolpropanetriacrylate was prepared. Nalco 2327 colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXV

A mixture of 51.46 grams of isopropanol, 1.0 gram of acrylic acid, 1.36 grams of hexanedioldiacrylate and 3.79 grams of trimethylolpropanetriacrylate was prepared. Nalco 2327 colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXVI

A mixture of 51.46 grams of isopropanol, 0.55 grams of benzoic acid, 1.36 grams of hexanedioldiacrylate and 3.79 grams of trimethylolpropanetriacrylate was prepared. Nalco 2327 colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXVII

A mixture of 51.46 grams of isopropanol, 0.57 grams of pentenoic acid, 1.36 grams of hexanedioldiacrylate and 3.79 grams of trimethylolpropanetriacrylate was prepared. Nalco 2327 colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXVIII

A mixture of 51.46 grams of isopropanol, 0.61 grams of hexanoic acid, 1.36 grams of hexanedioldiacrylate and 3.79 grams of trimethylolpropanetriacrylate was prepared. Nalco 2327 colloidal silica, 11.24 grams, was added. The mixture was shaken before being flow coated onto a 4×4×1/16 inch polycarbonate panel and allowed to air dry for five minutes. The coated panel was cured as in Example I. The test results are summarized in Table I.

EXAMPLE XXIX

A mixture of 51.46 grams of isopropanol, 1.36 grams of hexanedioldiacrylate and 3.79 grams of trimethylolpropanetriacrylate was prepared. The mixture was flow coated onto a 4×4×1/16 inch polycarbonate panel and allowed to air dry for five minutes. The coated panel was cured as in Example I. The test results are summarized in Table I.

EXAMPLE XXX

A mixture of 51.46 grams of isopropanol, 5.15 grams of trimethylolpropanetriacrylate and 11.24 grams of Nalco 1034A colloidal silica was prepared. The mixture was flow coated onto a 4×4×1/16 inch polycarbonate panel and allowed to air dry for five minutes. The coated panel was cured as in Example I. The test results are summarized in Table I.

and spirit of the invention being indicated by the following claims.

That which is claimed is:

1. A radiation curable coating composition comprising:
   (A) from 30 to 99 percent, based on the total weight of the composition, of at least one multifunctional acrylate or methacrylate monomer; and
   (B) from 1 to 70 percent, based on the total weight of the composition, of colloidal silica dispersed in water or in an organic solvent/water mixture.

2. The composition of claim 1 wherein component (A) is trimethylolpropanetriacrylate.

3. The composition of claim 1 wherein component (A) is a mixture of trimethylolpropanetriacrylate and hexanedioldiacrylate.

4. The composition of claim 1 wherein component (B) is a dispersion of colloidal silica in isopropanol and water.

5. The composition of claim 1 including a diluent selected from the group consisting of isopropanol, t-butanol, n-propanol, n-butanol, methanol, ethanol, ethylene glycol n-butyl ether, and mixtures thereof.

6. The composition of claim 5 wherein the diluent is present in an amount of from 40 to 85 percent, based on the total weight of the composition.

7. The composition of claim 5 wherein the diluent is present in an amount of from 53 to 78 percent, based on the total weight of the composition.

8. The composition of claim 1 which additionally contains one or more hindered amine light stabilizer.

9. The composition of claim 8 wherein the hindered amine light stabilizer is bis(1,2,2,6,6-pentamethyl-4-piperidinyl)[3,5-bis(1,1-dimethylethyl-4-hydroxyphenyl)methyl]-butylpropanedioate.

10. The composition of claim 1 which additionally contains one or more UV absorbers.

TABLE I

| Coating Compositions | ADHESION TEST | STEEL WOOL | PENCIL TEST | ABRASION TEST % $H_{100}$ | ABRASION TEST % $H_{500}$ | % LIGHT TRANSMITTANCE |
|---|---|---|---|---|---|---|
| Ex. I | 100% | 2 | B | 4.50 | 10.70 | 99.4 |
| Ex. II | 100% | 2 | B | 3.63 | 6.98 | 93.1 |
| Ex. III | 100% | 2 | B | 3.35 | 12.60 | 81.1 |
| Ex. IV | — | — | — | 17.13 | 53.85 | 87.4 |
| Ex. V | 100% | 2 | HB | 0.50 | 16.03 | 66.3 |
| Ex. VI | — | — | — | — | — | 85.7 |
| Ex. VII | 100% | 1 | 2B | — | — | 70.9 |
| Ex. VIII | 100% | 2 | B | 5.58 | 14.98 | 90.9 |
| Ex. IX | 100% | 1 | 2B | — | — | 82.3 |
| Ex. X | 100% | 2 | B | 20.10 | 35.35 | 93.7 |
| Ex. XI | 100% | 2 | HB | 5.33 | 11.92 | — |
| Ex. XII | 100% | 2 | HB | 14.58 | 29.53 | — |
| Ex. XIII | 100% | 2 | HB | 2.08 | 4.98 | — |
| Ex. XIV | 100% | 2 | HB | 10.45 | 18.08 | — |
| Ex. XV | 100% | 2 | B | 12.75 | 23.48 | 97.7 |
| Ex. XVI | 100% | 2 | B | 6.53 | 18.55 | 93.7 |
| Ex. XVII | 100% | 2 | B | 17.13 | 36.00 | 94.3 |
| Ex. XVIII | 100% | 2 | B | 4.78 | 13.80 | 96.6 |
| Ex. XIX | 100% | 2 | F | 8.10 | 47.40 | 99.4 |
| Ex. XX | 100% | 2 | B | — | — | 97.4 |
| Ex. XXI | 100% | 2 | B | 3.30 | 8.53 | — |
| Ex. XXII | 100% | 2 | H | — | — | — |
| Ex. XXIII | 100% | 2 | F | — | — | 78.9 |
| Ex. XXIV | 100% | 2 | B | — | — | 81.7 |
| Ex. XXV | 100% | 2 | B | 4.25 | 11.53 | 96.0 |
| Ex. XXVI | 100% | 2 | HB | 3.30 | 11.90 | — |
| Ex. XXVII | 100% | 2 | HB | 7.95 | 16.63 | — |
| Ex. XXVIII | 100% | 2 | HB | 3.33 | 11.28 | — |
| Ex. XXIX | 100% | 2 | B | 9.23 | 41.98 | — |
| Ex. XXX | 100% | 2 | B | — | — | 97.4 |

The results in Table I indicate that abrasion resistant coating compositions containing multifunctional acrylates or methacrylates and colloidal silica, and optionally containing a diluent selected from the aforementioned group, form transparent abrasion resistant coatings when applied to a substrate and radiation cured. Furthermore, excellent results were obtained whether the coating compositions were cured by ultraviolet light or by electron beam radiation.

Other embodiments of the invention will be apparent to those skilled in the art from a consideration of this specification or practice of the invention disclosed herein. It is intended that the specification and examples be considered as exemplary only, with the true scope 11. A composition of claim 10 wherein the UV absorber is 2,2',4,4'-tetrahydroxybenzophenone.

12. The composition of claim 1 which additionally contains one or more photoinitiators.

13. The composition of claim 12 wherein the photoinitiator is 2-hydroxy-2-methyl-1-phenyl-propan-1-one.

14. The composition of claim 12 which additionally contains one or more oxygen inhibitors.

15. A composition of claim 14 wherein the oxygen inhibitor is 2-ethylhexyl-para-dimethylaminobenzoate.

* * * * *